United States Patent [19]

Jung

[11] Patent Number: 4,804,827

[45] Date of Patent: Feb. 14, 1989

[54] IDENTITY CARD

[75] Inventor: Folker Jung, Wertingen, Fed. Rep. of Germany

[73] Assignee: Jung GmbH, Munich, Fed. Rep. of Germany

[21] Appl. No.: 938,407

[22] Filed: Dec. 5, 1986

[30] Foreign Application Priority Data

Feb. 21, 1986 [DE] Fed. Rep. of Germany ....... 3605625

[51] Int. Cl.[4] ........................ G06K 19/02; B42D 15/02

[52] U.S. Cl. ........................................ 235/488; 283/74; 283/107; 283/108

[58] Field of Search ........................ 235/487, 488, 493; 360/2, 131, 137; 156/244.11, 244.19, 277, 298; 283/70, 74, 75, 57, 94, 107, 108, 109, 110, 111

[56] References Cited

U.S. PATENT DOCUMENTS

| | | | |
|---|---|---|---|
| 3,897,964 | 8/1975 | Oka et al. | 283/111 |
| 3,930,924 | 1/1976 | Oka et al. | 283/111 |
| 4,132,350 | 1/1979 | Kubota | 235/488 |
| 4,297,570 | 10/1981 | Kowalski | 235/488 |
| 4,356,391 | 10/1982 | Takeda | 235/488 |
| 4,456,639 | 6/1984 | Drower et al. | 283/107 |

*Primary Examiner*—A. D. Pellinen
*Assistant Examiner*—Leon K. Fuller
*Attorney, Agent, or Firm*—Pascal & Associates

[57] ABSTRACT

An identity card, on which a printing area is to be electrostatically printed, consists of a two-layer paper laminate in which the adhesive layer joining the two layers is colored. The paper laminate is calendered and has a thickness of approximately 0.3 mm and a weight per unit area of approximately 300 g/m$^2$. Both surfaces are provided with a pigment layer and a varnish made of a recticulated acrylate varnish, which each leave a printing area open.

16 Claims, 1 Drawing Sheet

IDENTITY CARD

The invention pertains to an identity card on a paper base, having at least one printing area for electrostatically printing particulars of the card.

Two types of identity cards are well known. A first type consists of a lightly sized cardboard, which has, however, the disadvantage that it bends easily, is not waterproof and frays easily. However, there are no difficulties printing on it by means of an electrostatic method. If such cards are sent to the recipient together with other information, then the card is usually part of the cardboard on which the other information is printed. It can then be detached by means of perforations. These types of cards are used, for example, by book clubs.

In addition, identity or membership cards made from a synthetic material are known; these cards are made relatively thin and are, thus, relatively flexible (thickness approximately 0.3 mm). In this case, it is necessary to mat the printing area in order to electrostatically print particulars. This is usually achieved by applying a synthetic material, which forms a mat, color-taking surface, to the printing area or by means of roughening. To print these cards, they are glued onto a carrier strip with their back side and pass through the printer in this way. The disadvantage with this method is that, when printing these cards which are made of a synthetic material, the printing process is electrostatically disturbed and, in some cases, eliminated.

It should be noted here that, during printing, the print is applied in powder form and the powder subsequently hardens. In high-speed printers, this takes place by curing at approximately 200° C. If the machine stops, then these types of identity cards melt, which leads to long shutdowns.

A further requirement is that the card must not separate from the carrier strip in the printer and in the subsequent processing machines, such as folding and enveloping machines, even if the carrier strip is led over guide rollers which have a small diameter. In order to fulfill this requirement, these cards are made very thin which, in turn, results in these cards making a low quality impression. They are translucent and, therefore, always only printed on one side.

It is the object of the invention to make the card in such a way that it is waterproof, sufficiently rigid, yet flexible enough so that it does not separate from the carrier strip and that it can be electrostatically printed without any difficulties and the print can be fixed.

A preferred embodiment of the invention is an identity card on a paper base having at least one printing area for electrostatically printing particulars of the card, comprised of at least a two-layer paper laminate having a colored adhesive layer forming the layers of paper, the paper laminate being sealed by calendering to a specific volume $V=d\times 1000/f$ of approximately one, in which d is the thickness in mm and f the weight per unit area of the paper laminate in $g/m^2$, both surfaces of the card being provided with a strongly sized pigment layer which leaves the printing area open, and both surfaces of the card having a reticulated acrylate varnish coating which leaves the printing area open.

An embodiment of the invention is described in greater detail in the following description with reference to the drawings, in which.

Figure 1:
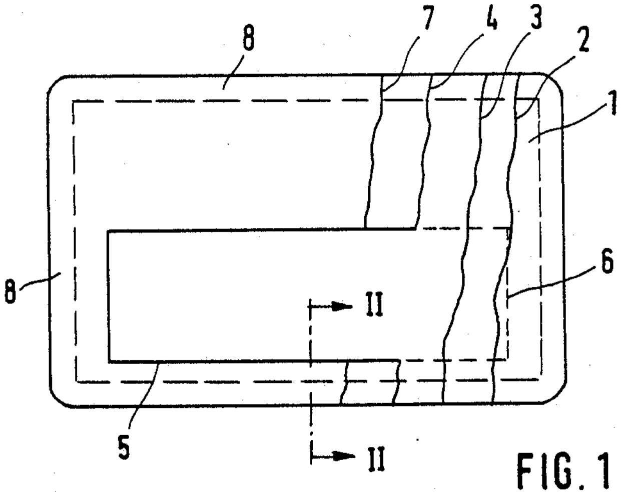
FIG. 1 is a top view of the card with partially separated layers.
Figure 2:
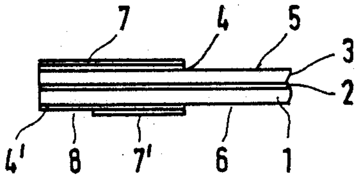
FIG. 2 is a section through the card along the line II—II in FIG. 1.

In the described embodiment of the invention, the card is comprised of a two-layer paper laminate. However it is also possible to use a laminate made of three layers.

The first lower paper layer 1 is joined to a second upper paper layer 3 via an adhesive layer 2. The adhesive layer 2 can contain a light color if the card is to be printed only on one side, or a dark color, such as intensely black or blue, to make the printing easier to read, if the card is to be printed on both sides. The intense dark color increases the opaqueness, that is, layer 2 prevents the print on the front or back of the card from shining through, allowing both printed sides of the card to be read without interference from the print on the other side of the card.

The laminate formed in this way is sealed by calendering to a specific volume V of approximately one, calculated according to the formula $V=d\times 1000/f$, where d is the thickness in mm and f is the weight per unit area of the paper laminate in $g/m^2$. Preferably, the thickness d is approximately 0.3 mm and the weight per unit area f approximately 300 $g/m^2$. Preferably, the calendering takes place in friction calenders.

Both surfaces of the cardboard are provided with a strongly sized pigment layer 4, i.e. a coating or layer of pigments with a high content of sizing material to obtain a poreless surface, which leaves the printing area 5 on the front of the card open. If there is also a printing area on the back of the card, as, for example, if printing area 6 is provided, then this area is also left open by the pigment layer 4' applied on the back. The bonding agent of this pigment line is preferably rubber-based in form of a rubber dispersion, i.e. the pigments are preferably bonded by a dispersion of rubber latex, forming sizing layers with a high content of rubber latex and a low content of pigments.

If one or both surfaces of the card are to be printed in order to, for example, be able to identify the type of card or membership, then the printing of the card now takes place both on the areas provided with pigment layers 4, 4' as well as on the printing areas 5, 6. A conventional printing process, preferably, screen printing, is used for this. Subsequently, both surfaces of the cards are provided with a varnish 7, which also leaves the printing areas 5, 6 open. In order to increase the adhesiveness of the card on a carrier strip, a border 8 on the back of the card can be left free of the varnish. The varnish preferably used for varnishing is an acrylate, which hardens by radiation and forms three-dimensional molecule chains. The hardening in this case takes place by ultraviolet or by electron rays.

The card is now finished and can be pasted onto a carrier strip for passing through an electrostatic printer. If there is a printing area 6 on the back of the card, then an adhesive layer on the carrier strip should have an opening corresponding to printing area 6.

The card made in this way does not carry any electric charge in the area of printing area 5, so that it can be printed without difficulty in printing area 5 by means of an electrostatic printing process. Printing area 6 on the back of the card can be used for applying a signature, which can also take place without difficulty.

The card has a good abrasive resistance and wet strength. Its great flexibility with respect to adhesive to the carrier strip also enables conveying the carrier strip over cylinders having a smaller diameter, for example in a printer, and processing machines following a printer, such as folding and enveloping machines. They can be removed from the carrier strip without leaving any residues. Their tearing and folding resistance is sufficient to meet the requirements to which they are subjected. Shey are insensitive to temperature and can therefore be processed in laser printers, where curing temperatures of approximately 200° C. occur.

The adhesion between the paper laminate and the pigment layer, as well as between the latter and the varnish, is greater than the adhesion between varnish and pigment layer, on the one hand, and the carrier strip, on the other hand, whereby the latter adhesion is, in turn, less than that between adhesive and carrier strip. As a result, the card can be removed from the carrier strip without damaging the card surface or without having size residues stick to it.

The pigment layer can be varnished and printed without difficulty. The pigment layer is a relatively flexible layer which does not break when the card is bent.

Instead of the noted radiation-hardening and thereby three-dimensionally reticulating acrylate varnish, a two-dimensionally reticulating acrylate varnish, dissolved in a solvent, can also be used.

The identity card has a high flexibility with great stability. It looks good, can be manufactured at a reasonable cost and can be processed in large quantities on high-speed printers. It withstands temperatures prevailing in the printer during machine shutdowns.

I claim:

1. An identity card on a paper base having at least one printing area for electrostatically printing particulars of the card, comprised of at least a two-layer paper laminate having a colored adhesive layer jointing the layers of paper, the paper laminate being sealed by calendering to a specific volume $V=d\times 1000/f$ of approximately one, in which d is the thickness in mm and f the weight per unit area of the paper laminate in $g/m^2$, both surfaces of the card being provided with a strongly sized pigment layer which leaves the printing area open, and both surfaces of the card having a reticulated acrylate varnish coating which leaves the printing area open.

2. An identity card as defined in claim 1, in which, on the back of the card which faces the printing area a border around the varnish at the edge of the card is left at least partially open.

3. An identity card according to claim 1, in which the card carries printing between the sized pigment layer and varnish.

4. An identity card according to one of claims 1, 2 or 3, in which a printing area is left open on both surfaces of the card.

5. An identity card according to claim 4, in which the printing areas laterally coincide.

6. An identity card according to claim 1, in which the varnish consists of an acrylate varnish which is three-dimensionally reticulated by means of radiation.

7. An identity card according to one of claims 1, 2, 3, or 6, further including a carrier strip coated with an adhesive substance to which the card sticks, the adhesive substance having an opening corresponding to the printing area on the back of the card.

8. An identity card according to one of claims 1, 2, 3, or 6, further including a carrier strip, to which the card is adherent, the adhesion thereof being weaker than that between the paper laminate and the pigment layer and between the pigment layer and the varnish.

9. An identity card according to one of claims 1, 2, 3, or 6, in which the pigment layer has a bonding agent formed of a latex dispersion.

10. An identity card according to claim 3, in which the printing area on either the top or both sides of the card is screen printed.

11. An identity card according to claim 7, in which the adhesive layer on the carrier strip is comprised of a rubber adhesive.

12. An identity card according to claim 8, in which the adhesive layer on the carrier strip is comprised of a rubber adhesive.

13. An identity card according to claim 4, further including a carrier strip coated with an adhesive substance to which the card sticks, the adhesive substance having an opening corresponding to the printing area on the back of the card.

14. An identity card according to claim 4, further including a carrier strip, to which the card is adherent, the adhesion thereof being weaker than that between the paper laminate and the pigment layer and between the pigment layer and the varnish.

15. An identity card according to claim 4, in which the pigment layer has a bonding agent formed of a latex dispersion.

16. An identity card as defined in claim 1, 2 or 3 in which the adhesive layer is colored dark.

* * * * *